March 25, 1941.     J. R. ALEXANDER     2,236,127
BICYCLE FORK
Filed May 5, 1939

Inventor
J. R. Alexander
By Munn, Anderson & Liddy
Attorney

Patented Mar. 25, 1941

2,236,127

UNITED STATES PATENT OFFICE 2,236,127

BICYCLE FORK

John R. Alexander, Paris, Tex.

Application May 5, 1939, Serial No. 272,010

2 Claims. (Cl. 280—279)

This invention relates to improvements in bicycles and it is particularly concerned with the construction of the fork which supports the front wheel. Bicycle forks, as conventionally made, are responsible for the transmission of a large number of shocks to the bicycle frame and to the body of the rider because there is little or no resiliency therein to serve as shock absorbers.

The result is that the frame becomes subject to premature crystallization. A perhaps more serious consequence is the fatigue to which the rider is subjected because of continuously receiving in his body the jolts from a rough road.

With this preamble in mind the objects of the invention are as follows:

First, to provide a bicycle fork wherein both sturdiness and resiliency are assured by the well-defined inverted loops in the legs of said fork, the mechanical advantage of said loops being derived from the extensive areas which the branches of the legs afford for the dissipation of shocks from the road.

Second, to provide a firm and dependable anchorage for each of the fork legs including the cross-slotting of the ends of the horizontal tubular body, to which slots the loops are well adapted because of their inversion providing components which are sufficiently straight to fit easily into the slots preparatory to the ultimate brazing or welding operation.

Third, to provide a fork of the foregoing character wherein the top components of the legs are only partially embedded in the ends of the horizontal body thus, in effect, to set the edges of said body back and convert the resultingly outstanding surfaces of said components into guards which ward off the clothing from said edges and prevent inadvertent tearing.

Figure 1:
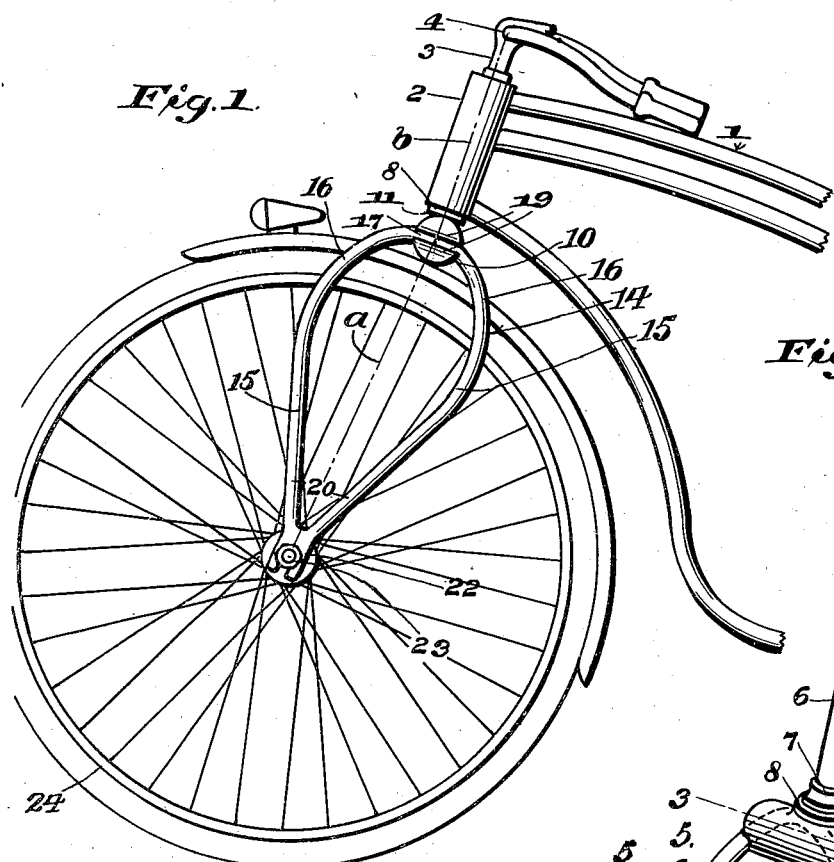
Figure 2:
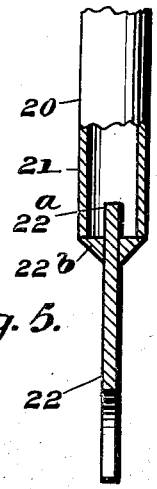
Figure 3:
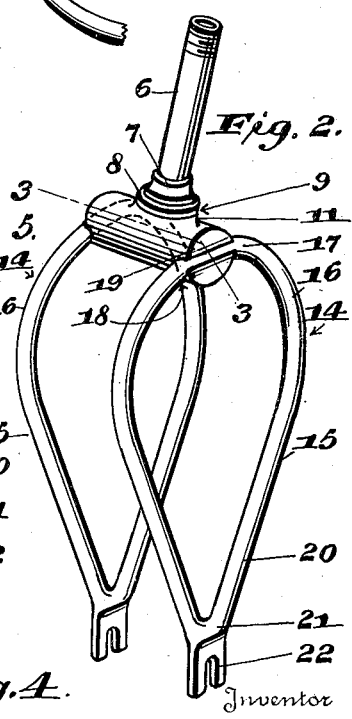
Figure 4:
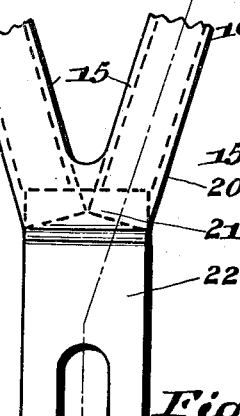
Figure 5:
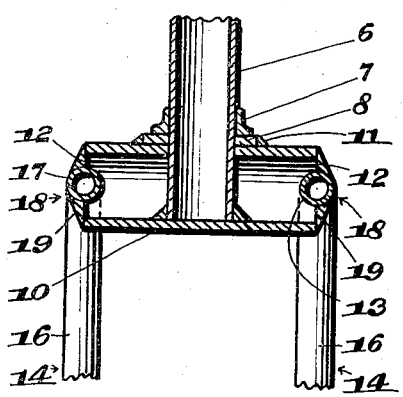

Other objects and advantages will appear in the following specification, reference being had to the accompanying drawing, in which:

Figure 1 is a side elevation of a portion of a bicycle, particularly illustrating the improved fork, Figure 2 is a perspective view of the fork, Figure 3 is a cross section taken on the line 3—3 of Fig. 2, Figure 4 is a detail side elevation of the crotch terminal of one of the fork legs, and Figure 5 is a section taken on the line 5—5 of Figure 4.

In Fig. 1 the bicycle is generally designated 1. This vehicle is constructed along more or less well known lines. The frame includes a tubular head 2 which is surmounted by the shaft 3 of the handle bars 4. Particular attention is directed to Fig. 1 which illustrates all of the invention.

The improved fork is generally designated 5. It comprises a stem 6 which fits in the tubular head 2 and has the shaft 3 of the handle bars secured therein according to any well known plan. This stem is tubular, and in practice, it is made either with a thin wall, suitably reinforced, or is made with a thick wall and without reinforcement.

The lower end of the stem carries a bearing cone 7, the bottom of which is made flush with the contiguous end of the stem. Said stem and cone are suitably secured to a washer 8 which is properly described as being incorporated in the joint 9 between the stem 6 and a transverse body 10.

Said body comprises a short section of tubing. The washer 8 is secured in a central position on this tubing by fillets of welding material 11. The ends 12 of the body 10 are slotted crosswise at 13. The slots are parallel to each other, and they stand substantially at right angles to the axis of the stem 6.

The legs 14 of the fork are formed in what is regarded a novel manner, and their structural arrangement is important to the accomplishment of the purpose which they are intended to serve. Each of the legs consists of what is herein termed an inverted loop. The branches 15 of each leg are widely bowed at 16. This bowing defines well pronounced curves which, in turn, provide a flatly arched component 17 which is well adapted to fit in the respective slot 13.

These components are sufficiently straight to fit in the slots 13 without the necessity of specially shaping the latter. It is to be noted, however, that the slots 13 are of less depth than the components 17, so that the surfaces 18 (Fig. 3) are made to stand out from the adjacent edges or ends 12 of the body 10. Said projecting or outstanding surfaces 18 thus constitute guards which prevent the possibility of snagging the clothing on the ends of the body 10 or of a person inadvertently injuring himself.

These possibilities are further reduced by the fillets 19 of welding material which secure the leg components 17 to the transverse body 10. These fillets so cover the ends 12 and portions of the components 17 as to partly embed the latter. The legs 14 are thus held absolutely immovable, and although the joint at 13 is immovable yet it does not interfere with the free flexure of the legs in their widely bowed portions 16.

The branches 15 taper rather sharply at 20 toward meeting points 21. These meeting points have crotch terminals 22. The crotches are in registration, and their obvious purpose is to support the axle 23 of the front wheel 24. Each crotch terminal consists of a fork plate, one end of which is inserted at 22a in the meeting point of the respective legs (Fig. 5), the joint being completed by fillets 22b of welding material.

It is because of the fact that the legs 14 are widely curved or bowed at 16 that provision is made of a large expanse of metal in which the road shocks are dissipated. Most of these shocks will be absorbed by the lateral flexure of the branches 15, so that the rider will be able to traverse a rough road with much less fatigue than if he were subjected to the full force of the incident shocks. It is to be noted in Fig. 1 that the axis $a$ of the legs 14 deviates slightly from the axis $b$ of the stem 6 and head 2, so that the axis of the fork legs stands at a slightly forward pitch in reference to the axis of the stem 6. This arrangement is an addition to the caster effect of the front wheel of the bicycle, and desirably so because it is a contribution toward the easy manipulation and it causes the front wheel to run straight.

Reverting to the general structure of the fork it is desired to point out that it is constructed almost entirely of tubing. This tubing requires no special processing other than sawing, drilling, slotting and bending. No stamping presses with dies are required, and no device for tapering is necessary.

Reverting to the connection of the stem 6 to the transverse body 10, it is to be noted in Fig. 3 that said stem penetrates the top portion of said body and comes to rest against its lower portion. The stem is then firmly welded at said lower portion so as to complete a very firm joint.

I claim:

1. In a bicycle fork having a stem, a body attached crosswise to one end of the stem, and a pair of legs consisting of inverted loops, being widely curved at one end to provide flatly arched components; said body having parallel cross-slots at the ends and having the arched components fitted therein, said slots being of less depth than said components thus to make the surfaces of the latter stand out from the adjacent edges of the body, and fillet means applied to the ends of said body and lapped onto said components, permanently securing said components in said cross slots and thus coacting with the outstanding components to act as guards.

2. In a bicycle fork having a stem, a body attached crosswise to one end of the stem, and a pair of legs depending from said body, each leg including a flatly arched component; said body being slotted cross-wise and in parallelism at the ends and having said components secured therein, said slots being of less depth than the components are thick so that said components stand out from said ends and form guards in advance of the otherwise sharp edges of the body.

JOHN R. ALEXANDER.